United States Patent [19]

Ginzburg et al.

[11] Patent Number: 5,408,500
[45] Date of Patent: Apr. 18, 1995

[54] METHOD AND APPARATUS FOR TRANSMISSION OF LOCAL AREA NETWORK SIGNALS OVER A SINGLE UNSHIELDED TWISTED PAIR

[75] Inventors: Simon A. Ginzburg, Groton; John Fitzgerald, Leominster, both of Mass.

[73] Assignee: Digital Equipment Corporation, Maynard, Mass.

[21] Appl. No.: 18,628

[22] Filed: Feb. 17, 1993

[51] Int. Cl.⁶ .................. H04L 25/34; H04L 25/49; H04K 1/02
[52] U.S. Cl. ............................ 375/288; 375/296
[58] Field of Search ............... 375/17, 18, 19, 36, 375/59, 60; 370/118; 341/56, 57

[56] References Cited

U.S. PATENT DOCUMENTS 3,649,751 3/1972 So .................................. 375/17
5,119,402 6/1992 Ginzburg et al. ............... 375/17

Primary Examiner—Stephen Chin
Assistant Examiner—Duane Kobayashi
Attorney, Agent, or Firm—Kenneth F. Kozik

[57] ABSTRACT

A binary signal encoding technique for reducing the amount of electromagnetic interference (EMI) caused by the transmission of high-speed binary signals over an unshielded twisted pair of conductors. Duobinary modulation, combined with low-pass filtering to confine the signals' frequency spectrum, and stop-band filtering to reduce critically high spectral lines, results in an acceptably low level of electromagnetic emission from the twisted pair. Moreover, duobinary modulation and stop-band filtering to reduce spectral lines avoids the need for signal scrambling to reach acceptable radiation levels by spreading the signal energy across the frequency spectrum.

20 Claims, 4 Drawing Sheets

METHOD AND APPARATUS FOR TRANSMISSION OF LOCAL AREA NETWORK SIGNALS OVER A SINGLE UNSHIELDED TWISTED PAIR

BACKGROUND OF THE INVENTION

This invention relates generally to digital communication channels for local area networks and, more particularly, to techniques for using unshielded twisted pairs of conductors as a communication medium in a high-speed local area network. High-performance local area networks (LANs) typically use optical fiber or coaxial cable as the communication medium. For example, one token ring network using optical fiber is known as the fiber distributed data interface (FDDI), and is intended for operation at a bandwidth of 125 megabits per second (Mb/s) over distances of about two kilometers. The physical layer medium dependent (PMD) sublayer protocol for FDDI is defined in an American National Standards Institute (ANSI) document designated X3T9.5/84-88. The other sublayer of the physical layer is known as the physical layer protocol (PHY) and is defined in ANSI X3.148-1988.

A significant drawback to LANs using optical fiber as the communication medium is the relatively high cost of the optical fiber. Relatively slow LANs have been proposed using much cheaper unshielded twisted pair wiring. U.S. Pat. No. 5,119,402 entitled "Method and Apparatus for Transmission of Local Area Network Signals Over Unshielded Twisted Pairs," issued in the names of Simon A Ginzburg et al., describes and claims a system in which FDDI signals are transmitted over two or more twisted pairs of conductors, using a modified three-level duobinary code and an arrangement of dumultiplexers and multiplexers. The modified duobinary code does not provide a practical solution to the problems involved with transmitting FDDI signals over a single twisted pair.

FDDI data transmission requirements have a frequency spectrum that quite literally transforms an unshielded twisted pair if conductors into a broadcasting antenna. As a result, satisfying the radiation limitations imposed by the Federal Communications Commission (FCC) is a matter of critical concern in designing a twisted pair communication medium suitable for FDDI signals. Electromagnetic radiation from a twisted pair medium can be reduced by lowering the driving voltage at the transmitting end of the twisted pair, but this may result in unsatisfactory performance, as measured by data error rate.

It is generally understood that transmitting FDDI signals over an unshielded twisted pair requires that the transmitted spectral width be decreased by the use of an encoding technique. A narrower transmitted spectrum results in lower signal attenuation, and therefore a longer transmission distance. The narrower spectrum also results in reduced crosstalk. More importantly, the narrower spectrum reduces overall electromagnetic emission, which allows driving voltages to be increased for improved performance, as reflected by some combination of lower error rate and longer transmission distance.

Several different solutions, in the form of different encoding schemes, have been proposed for FDDI transmission of unshielded twisted pairs. For completeness, they are briefly summarized in the following paragraphs.

Carrierless amplitude/phase encoding, known as CAP-32, maps five bits into thirty-two amplitude/phase symbols (with six amplitude levels) using a pair of superimposed waveforms generated from an orthogonal pair of bandpass filters. The principal disadvantage of the CAP encoding scheme is that it requires the use of elaborate digital signal processing apparatus. A similar scheme is known as QAM-32, except that it uses a 25 MHz carrier and its signal spectrum occupies a 50 MHz frequency range instead of the 25 MHz of CAP-32.

Two binary, one quaternary (2B1Q) encoding is a 4-level pulse amplitude modulation (4-PAM) technique. The code converts blocks of two consecutive binary digits into a single 4-level pulse for transmission. The scheme requires crosstalk suppression, scrambling of the data to spread the energy across the spectrum, and adaptive equalization to compensate automatically for channel characteristics as the channel length is changed.

8B10 code is an 8-level pulse amplitude modulation (PAM) scheme with low crosstalk immunity, and requires careful equalization.

Modified duobinary (MDB) code, used in the aforementioned patent to Ginzburg et al, is also known as PR-4 code. Its three-level format compresses the spectrum by about half. The spectrum has nulls at 0 and 62.5 MHz and the energy peak is at 32.5 MHz. The principal drawback of this scheme is that the use of two channels in each direction requires demultiplexing and multiplexing functions.

Another code known as QPR-4, or quaternary PR-4, has a spectral null at about 62 MHz and a spectral peak at about 17 MHz. It requires an analog-to-digital converter and digital signal processing based equalization and crosstalk suppression.

Predistorted NRZI coding is not a serious contender since it does not compress the frequency spectrum. NRZI stands for "nonreturn to zero, invert on ones." What this means is that a polarity transition in the signal represents a logical "1" and the absence of a polarity transition represents a logical "0." In predistorted NRZI coding, distortion is introduced in the transmitter to compensate for the channel frequency response. Since the spectrum is not compressed, the technique requires crosstalk suppression and careful scrambling.

Multi-Level Transmit 3-level (MLT-3) code is a 3-level variation on NRZI. A logical "1" is represented as a transition between adjacent signal levels. Each "0" input bit causes the same level to be repeated in the code, and each "1" input bit causes the code to advance by one level, in the sequence positive-zero-negative-zero. MLT-3 is another code that requires scrambling to spread its spectral energy across the frequency spectrum and avoid high-amplitude spectral lines that would present an emission problem for FCC certification.

Although a number of coding alternatives have been proposed, each has its drawbacks and none has yet emerged as an official or unofficial standard for FDDI transmission over a twisted pair of conductors. The present invention proposes a simpler alternative that solves many of the problems posed by other coding schemes, and provides a significant advantage in terms of electromagnetic emission.

SUMMARY OF THE INVENTION

The present invention resides in the use of duobinary modulation (DBM) and stop-band filtering for the transmission of local area network signals, such as FDDI signals. Briefly, and in general terms, the method of the invention comprises the steps of encoding the binary data into a three-level duobinary code having a frequency spectrum with relatively low spectral density above a first node in the spectrum; lowpass filtering the duobinary code to further compress the bandwidth of the duobinary code; filtering the duobinary code with a stop-band filter selected to reduce the amplitude of a narrow peak in the frequency spectrum; and transmitting the filtered duobinary code onto an unshielded twisted pair of conductors. Electromagnetic emission from the twisted pair of conductors is reduced to an acceptable level by the combination of duobinary coding and stop-band filtering.

At a receiving end of the transmission, the method further comprises compensating for the frequency response of the twisted pair of conductors, and decoding duobinary code received over the unshielded twisted pair of conductors back into binary code. More specifically, the encoding step includes adding the binary data stream and a time-delayed replica of the binary data stream, to yield the duobinary code. Preferably, the encoding step further includes precoding the binary data, prior to the step of adding, to form a precoded binary data stream that eliminates error propagation and simplifies decoding. When precoding is included, the decoding step includes rectifying the received duobinary code.

When considered specifically in relation to transmission over a twisted pair in conformance with the fiber distributed data interface (FDDI), the method includes encoding the binary data into a three-level duobinary code having a frequency spectrum with relatively low spectral density above a first node in the spectrum at 62.5 MHz; lowpass filtering the duobinary code to further confine the bandwidth of the duobinary code below approximately 60 MHz; filtering the duobinary code with a stop-band filter selected to reduce the amplitude of a narrow peak in the frequency spectrum at approximately 31.25 Mhz, due to the transmission of FDDI idle codes; and transmitting the filtered duobinary code onto an unshielded twisted pair of conductors. The electromagnetic emission from the twisted pair of conductors is reduced to an acceptable level without the need for signal scrambling.

In terms of novel apparatus, the invention is embodied in digital signal communication apparatus for transmitting a stream of high-speed binary data over a twisted pair of conductors operating as a baseband communication channel. The apparatus comprises encoding means, for encoding the binary data into a three-level duobinary code having a frequency spectrum with relatively low spectral density above a first node in the spectrum; a low-pass filter to further compress the bandwidth of the duobinary code; a stop-band filter, to reduce the amplitude of a narrow peak in the frequency spectrum of the duobinary code; and means for transmitting the filtered duobinary code onto an unshielded twisted pair of conductors.

It will be appreciated from the foregoing that the present invention represents a significant advance in the field of high-speed digital communication over unshielded twisted pairs of conductors. In particular, the invention provides a simple coding and filtering technique that reduces electromagnetic emission to an acceptable level. Other aspects and advantages of the invention will become apparent from the following more detailed description, taken in conjunction with the accompanying drawings.

DESCRIPTION OF THE PREFERRED EMBODIMENT

Figure 1:
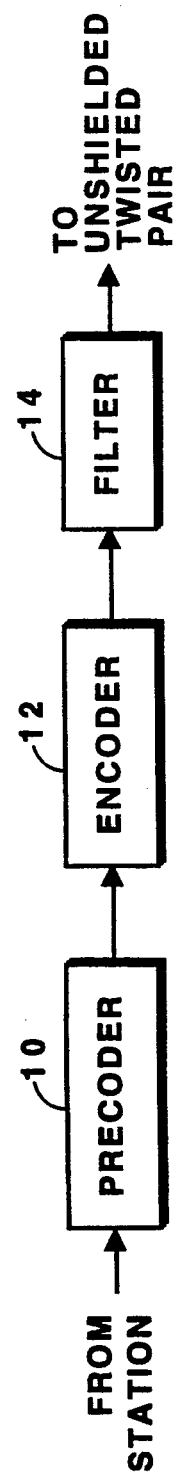
FIG. 1 is a block diagram of a duobinary encoder, precoder and filter in accordance with the invention.

As shown in the drawings for purposes of illustration, the present invention is concerned with a technique for transmitting high-performance local area network (LAN) signals, such as those associated with the fiber distributed data interface (FDDI), over a single unshielded twisted pair of conductors.

In accordance with the invention, local area network data signals are encoded using a three-level duobinary modulation (DBM) scheme and stop-band filtering is used to reduce spectral peaks to an acceptable level. There are two versions of DBM. In one version, a data "1" bit is coded to a logical "0" and a data "0" is coded to "+1" or to "−1." In the other version, a data "1" is coded to "+1" or "−1" and a data "0" is coded to "0." The second version will be discussed in this specification, and it will be noted that this version complies with the common convention that a data "1" is represented by the presence of a positive or negative pulse, whereas a data "0" is represented by the absence of a pulse.

As shown in FIG. 1, FDDI signals to be transmitted over an unshielded twisted pair are subject to processing by a precoder 10, a duobinary encoder 12 and a filter 14. As conventionally used, duobinary encoded signals are preshaped by a low-pass filter, and this function would typically be performed by the filter 14. However, as will be further discussed the filter 14 also has another function in the present invention.

Because duobinary is derived from consecutive binary data signals, it cannot be decoded without knowledge of prior values of the decoded signals. Decoding is simplified, however, with the use of the precoder 10, and each duobinary signal received can be translated directly into binary code without reference to prior values of the translated binary code.

Figure 2:
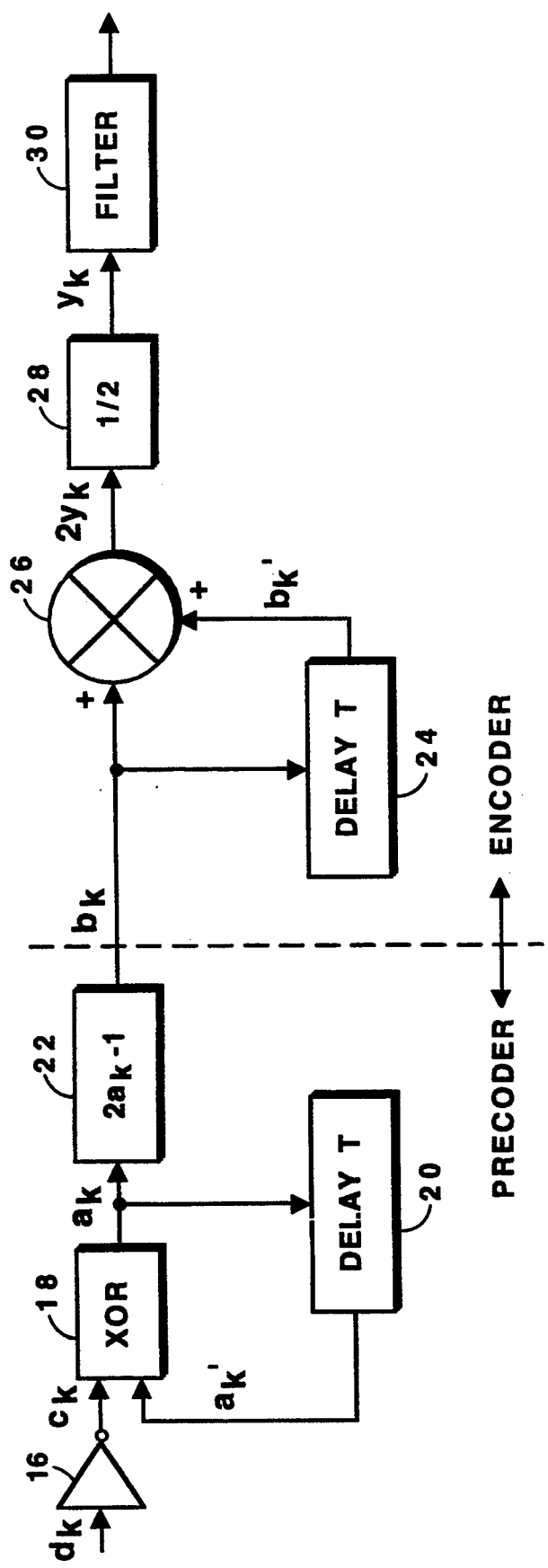
FIG. 2 is a block diagram similar to FIG. 1, showing more detail of the encoder and precoder.

FIG. 2 shows the decoder 10 and encoder 12 in more detail. The precoder includes an inverter 16 to invert the polarity of the incoming data signals, an exclusive OR (XOR) gate 18 and a delay circuit 20 for interposing a one-bit time delay. A data stream to be transmitted is input through the inverter 16 to the XOR gate 18, which provides the precoder output. The other input to the XOR gate 18 is derived from the output of the XOR gate delayed by the delay circuit 20. Use of the precoder simplifies decoder design and eliminates error propagation. In general, an error in three-level duobinary code occurs because of a misinterpretation between adjacent levels. Decoding a duobinary code signal (without precoding) requires knowledge of the prior value of the signal. Hence an error in one code can propagate to the next on decoding. With precoding, each duobinary code signal can be decoded without knowledge of prior values of the signal. Therefore, code errors are not propagated from one data bit to the next.

To obtain the desired duobinary code it is necessary to convert the precoded unipolar sequence, referred to as $a_k$, obtained from the exclusive OR gate 18, to a bipolar sequence referred to as $b_k$, where the subscript k refers to the number or index of the binary sequence. Thus the sequence referred to as $a_k$ is $a_1, a_2, a_3, \ldots a_k$. A unipolar-to-bipolar conversion can be effected by the transformation: $b_k = 2a_k - 1$, as indicated in block 22. The data sequence input to the precoder is referred to as $d_k$ and the inverted data input sequence is $c_k$.

The encoder 12 includes a delay circuit 24 and an adder circuit 26. Signals input to the encoder 12 are applied to the adder 26 and to the delay circuit 24. The signals output from the delay circuit 24 are applied as a second input to the adder 26. Therefore, the adder 26 produces output signals, indicated as $2y_k$, derived by adding the delayed input and the undelayed input. These are three-level duobinary signals having possible values $-2$, 0, and $+2$. To restore these signals to the same scale as the input signals requires a divide-by-two circuit, as shown at block 28, the output of which is indicated as $y_k$. The output of the encoder 12 is subject to filtering in the filter 14 (of FIG. 1).

Although duobinary coding is not in itself novel, an explanation of the encoding scheme is provided for completeness, and as an aid to understanding the present invention. The following table illustrates how the precoder and encoder operate on a sample data stream. $a_k'$ refers to the delayed $a_k$ sequence, and $b_k'$ refers to the delayed $b_k$ sequence.

| $d_k$ | 0 | 1 | 1 | 0 | 0 | 1 | 0 | 1 | 1 | 0 | 0 | 1 | 0 | 1 | 1 | 1 | 0 | 0 | 1 |
| $c_k$ | 1 | 0 | 0 | 1 | 1 | 0 | 1 | 0 | 0 | 1 | 1 | 0 | 1 | 0 | 0 | 0 | 1 | 1 | 0 |
| $a_k$ | 1 | 1 | 1 | 0 | 1 | 1 | 0 | 0 | 0 | 1 | 0 | 0 | 1 | 1 | 1 | 1 | 0 | 1 | 1 |
| $a_k'$ | 0 | 1 | 1 | 1 | 0 | 1 | 1 | 0 | 0 | 0 | 1 | 0 | 0 | 1 | 1 | 1 | 1 | 0 | 1 |
| $b_k$ | + | + | + | − | + | + | − | − | − | + | − | − | + | + | + | + | − | + | + |
| $b_k'$ | − | + | + | + | − | + | + | − | − | − | + | − | − | + | + | + | + | − | + |
| $y_k$ | 0 | + | + | 0 | 0 | + | 0 | − | − | 0 | 0 | − | 0 | + | + | + | 0 | 0 | + |

Note that the precoder output ($a_k$) is the exclusive OR of the inverted data input ($c_k$) and $a_k'$, the delayed form of $a_k$. The sequence $b_k$ is determined in block 22 as $2a_k - 1$ and is shown as a sequence of + and − quantities, where "+" means $+1$ and "−" means $-1$. The bipolar sequence $b_k$ is equivalent to the binary sequence $a_k$ except that the binary 1 terms have been replace by $+1$ and the binary 0 terms have been replaced by $-1$. The output of the adder 26 is given by $b_k + b_k'$. Since each of the terms $b_k$ and $b_k'$ may have the values $+1$ or $-1$, the adder output has possible values of $+2$, 0 or $-2$, which is why the output signal from the adder is labeled $2y_k$ in FIG. 2. To preserve the same scale as the original binary input signal, the divide-by-two circuit 28 reduces the sequence to $Y_k$, with possible values $+1$, 0 and $-1$. The last row of the table gives the sequence $y_k$, where "+" means $+1$ and "−" means $-1$.

Note that the duobinary sequence $y_k$ is equivalent to the input data sequence $d_k$ except that original binary 1's are encoded as either + or − levels. Further, when original binary 1's are separated by an odd number of 0's in the original binary sequence, the 1's are encoded as pulses of opposite polarity in the duobinary sequence, as is the case for the sixth and eighth terms in the sample $y_k$ sequence. When original binary 1's are separated by an even number of 0's (or by no 0's at all, the 1's are encoded as pulses of the same polarity in the duobinary sequence, as is the case for the second, third, and fifth terms in the sample $y_k$ sequence.

Figure 4:
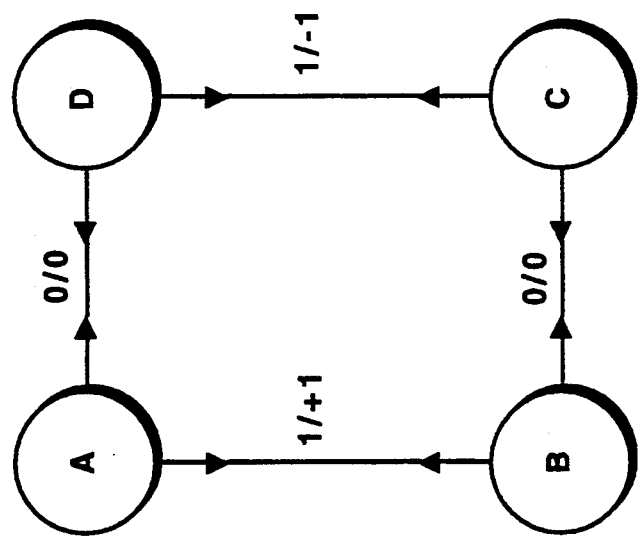
FIG. 4 is state diagram corresponding to the precoder and encoder of FIGS. 1 and 2.

Operation of the precoder and encoder combination may also be represented in the form of a state machine diagram, as shown in FIG. 4. The state machine may be depicted as having four states, A, B, C and D. Beginning in state A, for example, if a binary 1 data bit is received the machine goes to state B and generates a $+1$ output signal, as indicated by the legend $1/+1$ on the path between states A and B. If a 0 binary data bit is received while in state A the machine goes to state D and generates a 0 output signal, as indicated by the legend 0/0 on the path between states A and D. The path between states B and C also generates a 0 output for 0 binary input, and the path between states C and D generates a $-1$ output for a binary 1 input.

It will be observed that the state diagram is consistent with the sample data table discussed above. A string of binary 0's will cause the state machine to alternate between states A and D or states B and C, depending on its starting point. Similarly, a string of binary 1's will cause the state machine to alternate between states A and B (producing a sequence of $+1$ output signals), or between states C and D (producing a sequence of $-1$ output signals). Whether a binary 1 results in a $+1$ or a $-1$ output signal depends on the number of binary 0's since the previous binary 1. For example, if the last output signal was $+1$, the machine will be in state A or state B. Subsequently, an even number of 0's will still leave the machine in state A or state B and the next binary 1 will then encode as a $+1$. On the other hand, an odd number of 0's will leave the machine in state C or state D and the next binary 1 will then encode as a $-1$.

Figure 3:
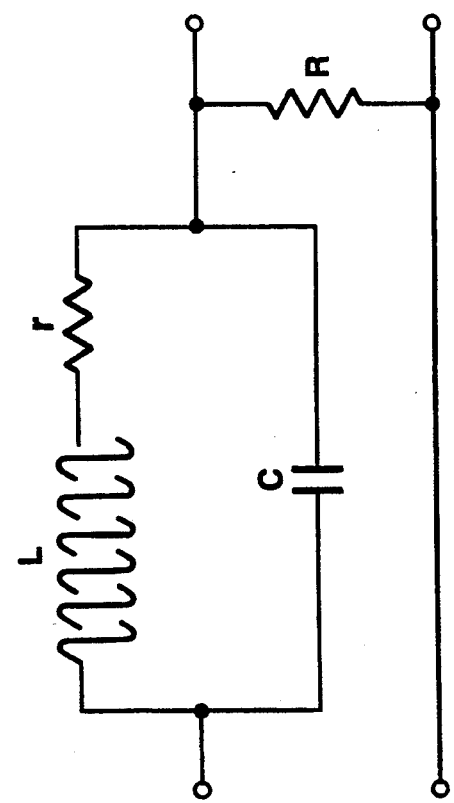
FIG. 3 is a schematic diagram of a stop-band filter included in the filter component of FIGS. 1 and 2.
Figure 5:
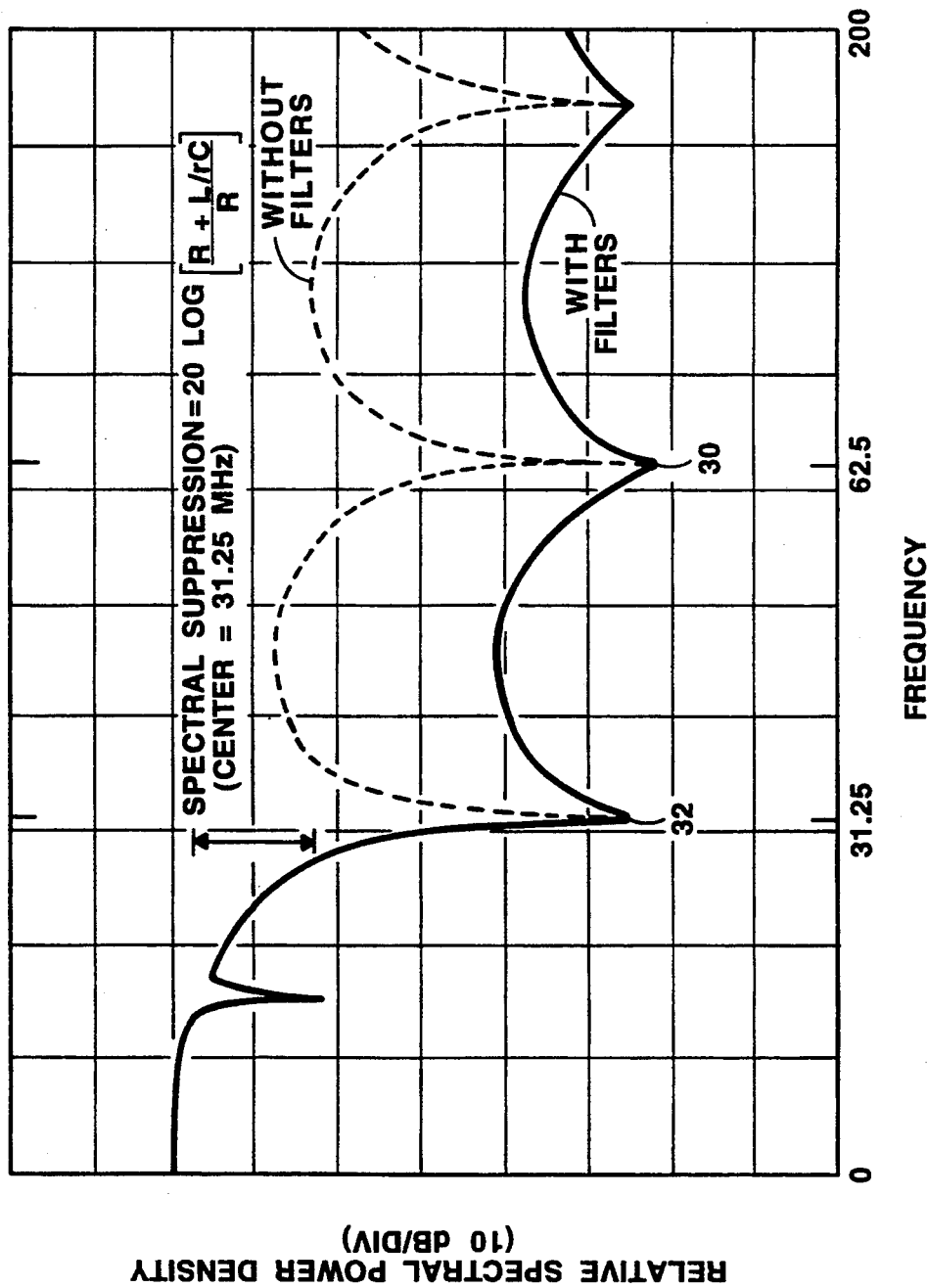
FIG. 5 is an exemplary graph showing the spectrum of duobinary signal after passing the stop-band and low-pass filters according to the present invention.

Referring to FIG. 5, in the FDDI encoding scheme there are repeating code patterns that create significant electromagnetic emission problems for twisted pair transmission. These patterns cause spectral peaks with high concentrations of energy at certain frequencies. One of the worst cases occurs when the FDDI ring is idle, when a constant pattern of all 1's is transmitted continuously. When this pattern is transmitted in NRZI encoding, it results in square wave at a frequency of 62.5 MHz 30. If duobinary coding is used, the idle pattern produces a sharp spectral line at a frequency of 31.25 MHz. In accordance with one aspect of the invention, the filter 14 includes a stopband filter component designed to suppress this spectral line to a point just below the Federal Communications Commission (FCC) limit. For the filter circuit shown in FIG. 3 to have a resonant frequency of 31.25 MHz 32, the product LC, where L is the inductance and C is the capacitance, must have a value:

$$LC = 1/(4 \times 3.14^2 \times 31.25^2 \times 10^{12}) = 2.6 \times 10^{-17}.$$

For example, L=2.6 μH (microhenries) and C=10 pF (picofarads).

The resonant impedance of this circuit is Z=L/rC. The coefficient of suppression of the spectral line at the resonant frequency is given by the ratio (Z+R) over R, where R is the shunt resistance in the filter circuit. Therefore, the coefficient of suppression can be adjusted by appropriate selection of components in the filter.

Duobinary modulated codes have a spectral peak at zero frequency and a first spectral null at 62.5 MHz when transmitting FDDI signals. This first lobe of the spectrum contains sufficient information to reconstruct data signals at a receiver. Therefore, the transmitted spectrum is practically confined below 60 MHz. In other approaches to transmission over a twisted pair, electromagnetic radiation in the range of 60–80 MHz is a significant problem, but this is avoided in the present invention. Duobinary modulation has approximately 78% of its energy below 30 MHz and 90% of all signal energy is concentrated below 42.6 MHz.

Comparison of duobinary modulation with MLT-3 coding reveals that MLT-3 has a slight advantage (2–3 dB) in the frequency range of 30–40 MHz, meaning that duobinary modulation produces components approximately 2–3 dB higher in this frequency range. As the frequency increases beyond 40 MHz, however, duobinary modulation has a significant edge over MLT-3. Above 62.5 MHz, the duobinary spectrum can be made extremely low by appropriate filtering, since the energy required for decoding is contained largely at lower frequencies. MLT-3 has a spectral density that remains high until about 100 MHz. Therefore, the present invention provides improved performance in terms of reduced electromagnetic emission.

It will be appreciated from the foregoing that the present invention represents a significant improvement in the field of network communication over unshielded twisted pairs of conductors. In particular, the invention provides a simpler technique for the transmission of FDDI signals over a single twisted pair. Duobinary modulation has a lower spectral density above 40 Mhz than competitive schemes, and can therefore meet FCC emission requirements more easily. Moreover, the use duobinary modulation with a stop-band filter reduces electromagnetic emission at a critical spectral line sufficiently to comply with FCC requirements. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A method for transmitting a stream of high-speed binary data over a twisted pair of conductors operating as a baseband communication channel, the method comprising the steps of:
   encoding the binary data into a three-level duobinary code having a frequency spectrum with a low spectral density above a first node in the spectrum;
   lowpass filtering the duobinary code to further compress the bandwidth of the duobinary code;
   filtering the duobinary code with a stop-band filter selected to reduce the amplitude of a narrow peak in the frequency spectrum; and
   transmitting the filtered duobinary code onto an unshielded twisted pair of conductors;
   wherein, electromagnetic emission from the twisted pair of conductors is reduced to an acceptable level.

2. A method as defined in claim 1, and further comprising the steps of:
   compensating for the frequency response of the twisted pair of conductors; and
   decoding duobinary code received over the unshielded twisted pair of conductors back into binary code.

3. A method as defined in claim 2, wherein the encoding step includes:
   adding the binary data stream and a time-delayed replica of the binary data stream, to yield the duobinary code.

4. A method as defined in claim 3, wherein the encoding step further includes:
   precoding the binary data, prior to the step of adding, to form a precoded binary data stream that eliminates error propagation and simplifies decoding.

5. A method as defined in claim 4, wherein:
   the decoding step includes rectifying the received duobinary code.

6. A method for transmitting a stream of high-speed binary data conforming with communication standards of a fiber distributed data interface (FDDI) over a twisted pair of conductors operating as a baseband communication channel, the method comprising the steps of:
   encoding the binary data into a three-level duobinary code having a frequency spectrum with a low spectral density above a first node in the spectrum at 62.5 MHz;
   lowpass filtering the duobinary code to further confine the bandwidth of the duobinary code below 60 MHz;
   filtering the duobinary code with a stop-band filter selected to reduce the amplitude of a narrow peak in the frequency spectrum range of 31.25 MHz, due to the transmission of FDDI idle codes; and
   transmitting the filtered duobinary code onto an unshielded twisted pair of conductors;
   wherein electromagnetic emission from the twisted pair of conductors is reduced to an acceptable level without the need for signal scrambling.

7. A method as defined in claim 6, and further comprising the steps of:
   compensating for the frequency response of the twisted pair of conductors; and
   decoding duobinary code received over the unshielded twisted pair of conductors back into binary code.

8. A method as defined in claim 7, wherein the encoding step includes:
   adding the binary data stream and a time-delayed replica of the binary data stream, to yield the duobinary code.

9. A method as defined in claim 8, wherein the encoding step further includes:
   precoding the binary data, prior to the step of adding, to form a precoded binary data stream that eliminates error propagation and simplifies decoding.

10. A method as defined in claim 9, wherein:

the decoding step includes rectifying the received duobinary code.

11. Digital signal communication apparatus for transmitting a stream of high-speed binary data over a twisted pair of conductors operating as a baseband communication channel, the apparatus comprising:

encoding means, for encoding the binary data into a three-level duobinary code having a frequency spectrum with a low spectral density above a first node in the spectrum;

a low-pass filter to further compress the bandwidth of the duobinary code;

a stop-band filter, to reduce the amplitude of a narrow peak in the frequency spectrum of the duobinary code; and means for transmitting the filtered duobinary code onto an unshielded twisted pair of conductors;

wherein electromagnetic emission from the twisted pair of conductors is reduced to an acceptable level.

12. Apparatus as defined in claim 11, and further comprising:

means for compensating for the frequency response of the twisted pair of conductors; and decoding means, for decoding duobinary code received over the unshielded twisted pair of conductors back into binary code.

13. Apparatus as defined in claim 12, wherein the encoding means includes:

means for adding the binary data stream to a time-delayed replica of the binary data stream, to yield the duobinary code.

14. Apparatus as defined in claim 13, wherein the encoding means further includes:

means for precoding the binary data to form a precoded binary data stream that eliminates error propagation and simplifies decoding.

15. Apparatus as defined in claim 14, wherein:

the decoding means includes means for rectifying the received duobinary code.

16. Digital signal communication apparatus for transmitting a stream of high-speed binary data conforming with communication standards of a fiber distributed data interface (FDDI) over a twisted pair of conductors operating as a baseband communication channel, the apparatus comprising the steps of:

encoding means, for encoding the binary data into a three-level duobinary code having a frequency spectrum with low spectral density above a first node in the spectrum at 62.5 MHz;

a low-pass filter to further confine the bandwidth of the duobinary code below 60 MHz;

a stop-band filter to reduce the amplitude of a narrow peak in the frequency spectrum range of 31.25 MHz, due to the transmission of FDDI idle codes; and means for transmitting the filtered duobinary code onto an unshielded twisted pair of conductors;

wherein electromagnetic emission from the twisted pair of conductors is reduced to an acceptable level without the need for signal scrambling.

17. Apparatus as defined in claim 16, and further comprising:

means for compensating for the frequency response of the twisted pair of conductors; and decoding means, for decoding duobinary code received over the unshielded twisted pair of conductors back into binary code.

18. Apparatus as defined in claim 17, wherein the encoding means includes:

means for adding the binary data stream and a time-delayed replica of the binary data stream, to yield the duobinary code.

19. Apparatus as defined in claim 18, wherein the encoding means further includes:

means for precoding the binary data to form a precoded binary data stream that eliminates error propagation and simplifies decoding.

20. Apparatus as defined in claim 19, wherein:

the decoding means includes means for rectifying the received duobinary code.

* * * * *